(12) United States Patent
Kuzuu

(10) Patent No.: US 7,194,806 B2
(45) Date of Patent: Mar. 27, 2007

(54) NAIL CLIPPER FOR PETS WITH CURVED CUTTING EDGES

(75) Inventor: Masayuki Kuzuu, Tochigi (JP)

(73) Assignee: Yuko Kuzuu, Tochigi (JP)

( * ) Notice: Subject to any disclaimer, the term of this patent is extended or adjusted under 35 U.S.C. 154(b) by 101 days.

(21) Appl. No.: 10/733,475

(22) Filed: Dec. 10, 2003

(65) Prior Publication Data
US 2004/0123465 A1 Jul. 1, 2004

(30) Foreign Application Priority Data
Dec. 31, 2002 (JP) ............................ 2002-383720

(51) Int. Cl.
A45D 29/02 (2006.01)

(52) U.S. Cl. ............................... 30/28; 30/192
(58) Field of Classification Search ............ 30/26, 30/27, 28, 29, 191, 192, 193; 132/75.4, 75.5
See application file for complete search history.

(56) References Cited

U.S. PATENT DOCUMENTS

| 441,065 | A | * | 11/1890 | Green ...................... 30/244 |
| 756,056 | A | * | 3/1904 | Roraback ................. 12/104.5 |
| 1,163,733 | A | * | 12/1915 | Bernard .................. 12/104.5 |
| 1,300,330 | A | * | 4/1919 | Bernard .................... 30/179 |
| 2,084,194 | A | * | 6/1937 | Frank ...................... 30/174 |
| 3,895,636 | A | * | 7/1975 | Schmidt ................... 606/205 |
| 5,701,672 | A | * | 12/1997 | Wachtel et al. ............ 30/28 |
| 6,473,969 | B2 | * | 11/2002 | Rinaldi ..................... 30/28 |
| 2004/0117988 | A1 | * | 6/2004 | Kuzuu ...................... 30/28 |

FOREIGN PATENT DOCUMENTS

DE 221436 * 4/1910 ............... 30/29

* cited by examiner

Primary Examiner—Kenneth E. Peterson
(74) Attorney, Agent, or Firm—Leighton K. Chong; Godbey Griffiths Reiss & Chong

(57) ABSTRACT

A nail clipper for pets has a clipper body formed with a pair of board spring arms with operating ends biased apart for mounting respective blade pieces thereon, and the blade pieces are each formed as a semi-circular or semi-elliptical ring half of a given thickness having a cutting edge formed on an inner facing rim thereof and diametrically opposing ends pivotally attached together with the semi-circular or semi-elliptical cutting edges positioned apart facing each other for insertion of a nail of a pet and closing together to cut the pet's nail. The blade pieces produce smooth nail edges cut in a semi-spherical or semi-elliptical shape in a single cutting action.

20 Claims, 2 Drawing Sheets

NAIL CLIPPER FOR PETS WITH CURVED CUTTING EDGES

TECHNICAL FIELD

This invention generally relates to a nail clipper for pets, and particularly, to one having a pinch-type clipper body provided with blade pieces having curved cutting edges.

BACKGROUND OF INVENTION

The conventional nail clipper for pets, such as dogs and cats, typically has a straight or slightly curved cutting edge. This presents a problem in that the nail when cut may have a sharp edge.

SUMMARY OF INVENTION

In accordance with the present invention, a nail clipper for pets has a pinch-type clipper body with blade pieces having the following distinctive features. The blade pieces are created by splitting a circular or elliptical ring, and a cutting edge is formed on the rim of each of the blade pieces. The two blade pieces are assembled facing one another with pins attaching the diametrical sides of the two semi-circular or semi-elliptical blade pieces so that the curved cutting edges of the blade pieces are positioned apart by a certain angle facing each other (to allow insertion of the nail of a pet therein) and can be pinched together. The blade pieces repeat the opening and retracting movement in rotational motion with the pin at the rotation center, cutting the pet's nail placed between the cutting edges of the curved blade pieces as a result. This produces smooth nail edges cut in a semi-circular or semi-elliptical shape in a single cutting action.

In a preferred embodiment, the nail clipper for pets has the curved blade pieces created by splitting a circular or an elliptical ring having a certain thickness, and the diametrical ends of each of the blade pieces are cut diagonally at an inclined angle. A longer arm piece is attached facing outward near one diametrical end of one curved blade piece parallel to the outer ring surface of the curved blade piece, and a shorter arm piece is attached facing outward near the other diametrical end of the curved blade piece parallel to the outer ring surface of the curved blade piece. Arm pieces are similarly attached to the diametrical sides of the other blade piece in opposite fashion from the first-mentioned blade piece. The longer arm piece and the shorter arm piece are attached to the outer ring surface of the curved blade pieces, while the rim of the inner ring surfaces of the curved blade pieces are formed into cutting blades or edges. A pivot ring piece with a pin hole is attached to the end of the longer arm piece, and another pivot ring piece with a pin hole is attached to the end of the shorter arm piece. The pivot ring piece of a shorter arm piece of one blade piece can thus fit behind the pivot ring piece of a longer arm piece of the other blade piece with the pin holes thereof in alignment to receive a pivot pin therein on one diametrical side, and vice versa for the other diametrical side. Thus, the diagonally cut ends at the diametrical sides of the two blade pieces can be joined together with their curved cutting edges positioned apart at an inclined angle facing each other.

A pin hole is drilled through the thickness of the ring half of each blade piece to form a chord at the apex of the ring half of each blade piece. The cutting edges of the two blade pieces are positioned outside of a straight line through the position of the pin holes in the apexes of the two blade pieces. The two blade pieces have their opposing diametrical sides connected by pivot pins for rotational movement relative to each other. Another pivot pin is inserted in the pin hole formed in the apex of each of the blade pieces and journaled through aligned pin holes formed in a support piece formed at a respective operating end of the pinch-type clipper body. The operating ends are on the ends of a pair of board spring arms of the pinch-type clipper body. The spring board arms are joined at their other ends, and are biased apart by a spring curvature or angle so that the support pieces hold the respective apexes of the curved blade pieces apart facing each other at top and bottom. An operating lever is attached on an exterior surface of an upper board spring arm by a retainer ring which holds a lever end of the operating lever and the operating ends of the board spring arms together, so that pressing of the operating lever results in the operating ends of the two board spring arms coming closer to one another. The cutting edges of the curved blade pieces can thus be pressed together completely in a straight line to cut the pet's nail placed between the cutting edges of the blade pieces.

Other objects, features, and advantages of the present invention will be explained in the following detailed description of the invention having reference to the appended drawings.

DETAILED DESCRIPTION OF INVENTION

Figure 1A:
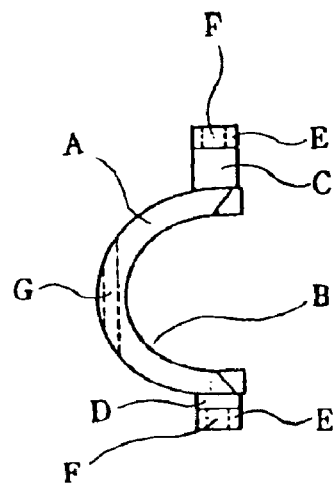
FIG. 1A is a overhead view.
Figure 1B:
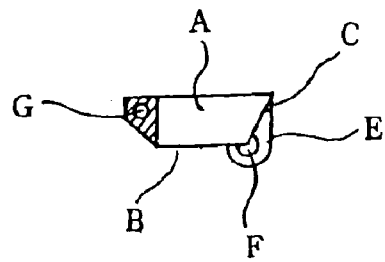
FIG. 1B is a side view.
Figure 1C:
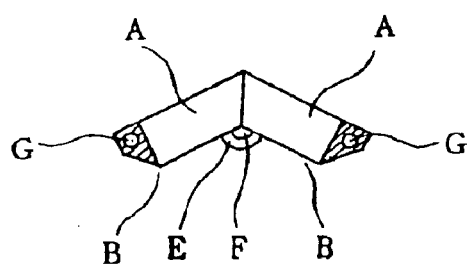
FIG. 1C is an assembled view of a preferred embodiment of the blade pieces with curved cutting edges for a nail clipper for pets in accordance with the present invention.

Referring to FIGS. 1A–1C, a preferred embodiment of a nail clipper for pets in accordance with the present invention has blade pieces A created by splitting a circular or an elliptical ring having some thickness. Both ends (at the diametrically opposite sides) of the semi-circular or semi-elliptical blade pieces A are cut diagonally through the ring thickness at an inclined angle. Each blade piece has a cutting edge B cut into the rim of the inner ring surface. A longer arm piece C is attached facing outward near one end of the curved blade piece A parallel to the outer ring surface of the blade piece A. A shorter arm piece D is attached facing outward near the other diametrical end of the curved blade piece A parallel to the outer ring surface of the blade piece A. A pivot ring piece E with pin hole F is attached to the end of the longer arm piece C, and another pivot ring piece E with pin hole F is attached to the end of the shorter arm piece D. Arm pieces with pin holes are similarly attached to the diametrical sides of the other blade piece in opposite fashion from the first-mentioned blade piece. The pin hole F in the pivot ring piece E on the longer arm piece C and the pin hole F in the pivot ring piece E on the shorter arm piece D are both aligned parallel to the outer ring surface of the blade piece A such that when the diametrical ends of the two blade pieces are assembled together, the pivot ring E of the shorter arm piece D fits behind the pivot ring E of the longer arm piece C with their pin holes F in alignment to receive a pivot pin therein.

A pin hole G is drilled through the thickness of the ring half of each blade piece to form a chord at the apex of the ring half of each blade piece. The cutting edges B of the two blade pieces are positioned outside of a straight line through the position of the pin holes G in the apexes of the two blade pieces. The two blade pieces A have their opposing diametrical sides connected by pivot pins through the pin holes F of the pivot rings E on the arm pieces C/D for rotational movement relative to each other.

Figure 2:
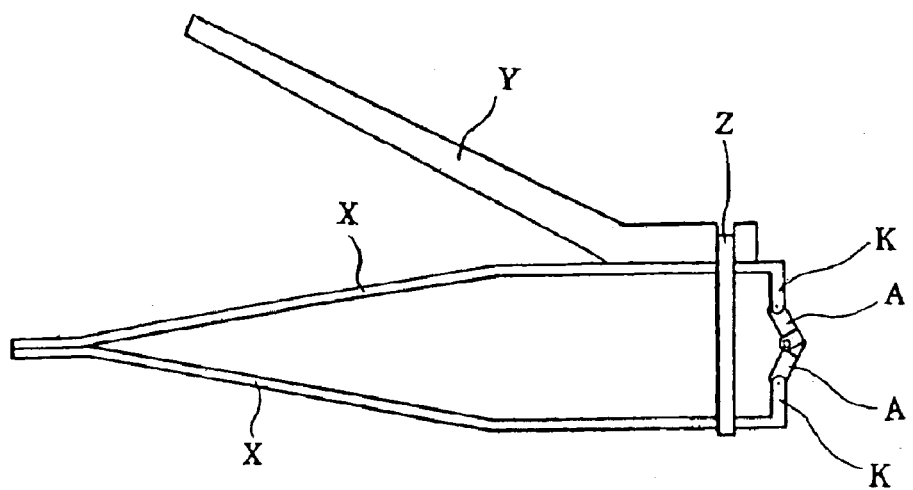
FIG. 2 is a side elevation view of the pinch-type nail clipper for pets assembled with the curved blades pieces.
Figure 3:
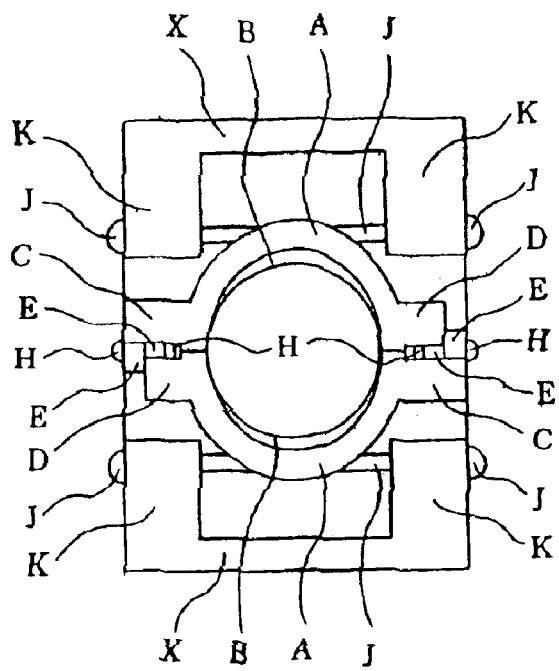
FIG. 3 is a front view of the operating ends of the pinch-type nail clipper for pets shown in FIG. 2.
Figure 4:
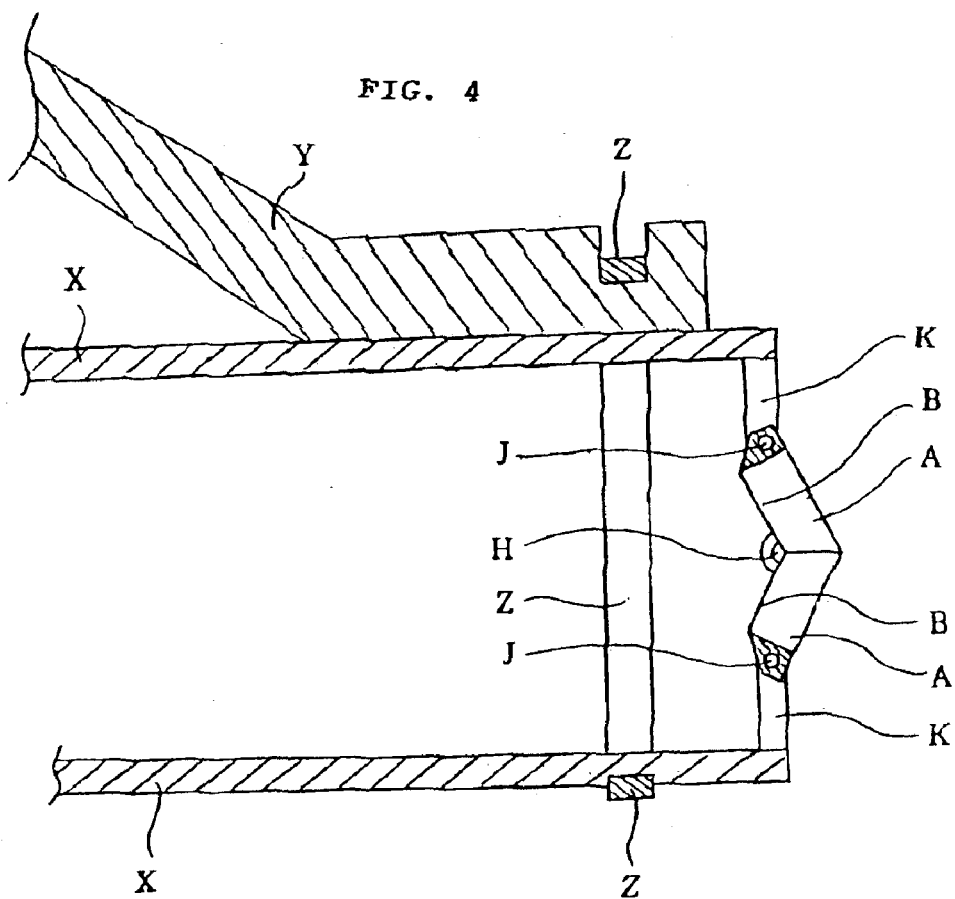
FIG. 4 is an enlarged side view of the operating ends of the pinch-type nail clipper for pets shown in FIG. 2.

Referring to the assembled views of the preferred embodiment of a nail clipper for pets in FIGS. 2, 3, and 4, the pin H is inserted through the pin holes F in the pivot rings E on the arm pieces C/D on both sides of the curved blade pieces A to connect their diametrical ends together. The two curved blade pieces A are thus able to repeat opening and closing of the cutting blades together through rotation movement with the pin H as the rotation center. The two blade pieces are assembled in position with the cutting edges B facing one another. The pin J is inserted through the pin hole G in both apexes of the curved blade pieces A and journaled through aligned pin holes in the support piece K to connect them together on each side. The support pieces K are formed at respective operating ends of a pair of board spring arms X of the pinch-type clipper body. The spring board arms X are joined at their other ends, and are biased apart by a spring curvature or angle so that the support pieces hold the respective apexes of the curved blade pieces apart facing each other at top and bottom. An operating lever Y is attached on an exterior surface of an upper board spring arm by a retainer ring Z which holds a lever end of the operating lever and the operating ends of the board spring arms X together, so that pressing of the operating lever Y results in the operating ends of the two board spring arms X coming closer to one another. The cutting edges B of the curved blade pieces can thus be pressed together completely in a straight line to cut the pet's nail placed between the cutting edges of the blade pieces.

Preferred dimensions and materials for the preferred embodiment of the nail clipper for pets are as follows. All of its parts are preferably made out of metal; The blade pieces A are made by splitting an elliptical ring with (major/minor) diameters of about 20 mm and 12 mm and a thickness of 4 mm. Both diametrical ends of the blade pieces A are cut diagonally at 75 degrees from the elliptical ring's surface. The longer arm piece C is about 4 mm long and 1 mm thick. The shorter arm piece D is about 3 mm long and 1 mm thick. The pivot ring piece E is about 1 mm thick with a 1 mm pin hole F. The pin hole G is drilled with about a 1 mm diameter. The cutting edges of the two blade pieces A are located about 1 mm outside of a straight line connecting the pin holes G in the two connected blade pieces A. The pin H has about a 1 mm diameter.

In summary, the nail clipper for pets of the present invention has a pinch-type clipper body provided with blade pieces that have semi-circular or semi-elliptical cutting edges. The blade pieces are created by splitting a circular or elliptical ring and forming cutting edges on the inner rim of the blade pieces. The two blade pieces are assembled with pins through their diametrical sides with the cutting edges positioned at an inclined angle facing one another. The blade pieces repeats the opening and closing movements in rotational motion with the connecting pins at the rotation center, cutting the pet's nail placed between the blades on the blade pieces as a result. The cutting movement produces smooth nail edges cut in a semi-circular or semi-elliptical shape in a single cutting action.

It is to be understood that many modifications and variations may be devised given the above description of the principles of the invention. It is intended that all such modifications and variations be considered as within the spirit and scope of this invention, as defined in the following claims.

What is claimed is:

1. A nail clipper for pets comprising a clipper body provided with board arms and a pair of opposing blade pieces, wherein said blade pieces are each formed as a semi-circular or semi-elliptical ring half of a given thickness having a cutting edge formed on an inner facing rim thereof and diametrically opposing ends on each ring half, and wherein said blade pieces are assembled to the clipper body and a central portion of each blade piece being pivotally attached to respective board arms such that their diametrically opposing ends pivotally are attached together and their semi-circular or semi-elliptical cutting edges are angled apart facing each other for insertion of nail of a pet therebetween and closing together to cut the pet's nail with a convex finish.

2. A nail clipper for pets according to claim 1, wherein said blade pieces have their diametrically opposing ends pivotally attached together with a pin forming a rotation center.

3. A nail clipper for pets according to claim 1, wherein said blade pieces produce smooth nail edges cut in a semi-circular or semi-elliptical shape in a single cutting action.

4. A nail clipper for pets according to claim 1, wherein said blade pieces are formed by splitting a circular or an elliptical ring having a given thickness.

5. A nail clipper for pets according to claim 1, wherein an arm piece is attached facing outward near one diametrical end of one blade piece, another arm piece is attached facing outward near the other diametrical end of the one blade piece, and arm pieces are similarly attached to the diametrical ends of the other blade piece in opposite fashion from the first-mentioned blade piece, said arm pieces having pivot ring pieces with pin holes provided on distal ends thereof to allow insertion of pivot pins in the pin holes for attaching the diametrical ends of the blade pieces together.

6. A nail clipper for pets according to claim 5, wherein each blade piece has a longer arm attached to one diametrical end and a shorter arm piece attached to the other diametrical end thereof, and each pivot ring piece of a shorter arm piece of one blade piece is fitted behind the pivot ring piece of a longer arm piece of the other blade piece with the pin holes thereof in alignment to receive a pivot pin therein.

7. A nail clipper for pets according to claim 5, wherein said diametrical opposing ends of each of the blade pieces are cut diagonally at an inclined angle, and the diagonally cut ends of the diametrically opposing ends of the blade pieces are attached together so that their cutting edges are positioned apart at an inclined angle facing each other.

8. A nail clipper for pets according to claim 1, wherein said board arms are a pair of board spring arms which are joined together at one ends thereof and have operating ends thereof which are biased apart by a spring curvature or angle so as to face each other at top and bottom for mounting the respective blade pieces thereon, and an operating lever attached on an external surface of an upper board spring arm by a retaining ring holding it to the operating ends of the board spring arms for opening and closing the blade pieces together.

9. A nail clipper for pets according to claim 8, wherein a pin hole is drilled through the thickness of the ring half of each semi-circular or semi-elliptical blade piece to form a chord at an apex thereof, and a pivot pin is inserted in the pin hole formed in the apex of each blade piece and journaled through aligned pin holes formed in a support piece on a respective operating end of a respective board spring arm to mount each blade piece to the clipper body.

10. A nail clipper for pets according to claim 9, wherein said blade pieces are mounted by the pivot pins to the support pieces on the operating ends of the board spring arms such that the apexes of the cutting edges of the blade pieces are positioned radially outside of a line through the pin holes formed in the apexes of the blade pieces.

11. A nail clipper for pets comprising:
  (a) clipper body having a pair of board spring arms which are joined together at one ends thereof and have operating ends thereof which are biased apart by a spring curvature or angle so as to face each other at top and bottom for mounting respective blade pieces thereon for opening and closing the blade pieces together;
  (b) a pair of opposing blade pieces, wherein said blade pieces are each formed as a semi-circular or semi-elliptical ring half of a given thickness having a cutting edge formed on an inner facing rim thereof and diametrically opposing ends on each ring half, and wherein said blade pieces are assembled to the clipper body with their diametrically opposing ends pivotally attached together and a central portion of each blade piece being pivotally attached to respective board arms such that their semi-circular or semi-elliptical cutting edges are angled apart facing each other for insertion of a nail of a pet therebetween and closing together to cut the pet's nail with a convex finish.

12. A nail clipper for pets according to claim 11, wherein said blade pieces have their diametrically opposing ends pivotally attached together with a pin forming a rotation center.

13. A nail clipper for pets according to claim 11, wherein said blade pieces produce smooth nail edges cut in a semi-circular or semi-elliptical shape in a single cutting action.

14. A nail clipper for pets according to claim 11, wherein said blade pieces are formed by splitting a circular or an elliptical ring having a given thickness.

15. A nail clipper for pets according to claim 11, wherein an arm piece is attached facing outward near one diametrical end of one blade piece, another arm piece is attached facing outward near the other diametrical end of the one blade piece, and arm pieces are similarly attached to the diametrical ends of the other blade piece in opposite fashion from the first-mentioned blade piece, said arm pieces having pivot ring pieces with pin holes provided on distal ends thereof to allow insertion of pivot pins in the pin holes for attaching the diametrical ends of the blade pieces together.

16. A nail clipper for pets according to claim 15, wherein each blade piece has a longer arm attached to one diametrical end and a shorter arm piece attached to the other diametrical end thereof, and each pivot ring piece of a shorter arm piece of one blade piece is fitted behind the pivot ring piece of a longer arm piece of the other blade piece with the pin holes thereof in alignment to receive a pivot pin therein.

17. A nail clipper for pets according to claim 15, wherein said diametrical opposing ends of each of the blade pieces are cut diagonally at an inclined angle, and the diagonally cut ends of the diametrically opposing ends of the blade pieces are attached together so that their cutting edges are positioned apart at an inclined angle facing each other.

18. A nail clipper for pets according to claim 11, wherein a pin hole is drilled through the thickness of the ring half of each semi-circular or semi-elliptical blade piece to form a chord at an apex thereof, and a pivot pin is inserted in the pin hole formed in the apex of each blade piece and journaled through aligned pin holes formed in a support piece on a respective operating end of a respective board spring arm to mount each blade piece to the clipper body.

19. A nail clipper for pets according to claim 18, wherein said blade pieces are mounted by the pivot pins to the support pieces on the operating ends of the board spring arms such that the apexes of the cutting edges of the blade pieces are positioned radially outside of a line through the pin holes formed in the apexes of the blade pieces.

20. A nail clipper for pets according to claim 11, wherein said clipper body includes an operating lever attached on an external surface of an upper board spring arm by a retaining ring holding it to the operating ends of the board spring arms.

* * * * *